(12) United States Patent
Wang et al.

(10) Patent No.: US 9,274,381 B2
(45) Date of Patent: Mar. 1, 2016

(54) FABRICATION METHOD OF A LIQUID CRYSTAL PANEL

(75) Inventors: Ling-Yung Wang, Tainan (TW); Te-Jen Tseng, Hsinchu (TW); Tai-Hsiang Huang, Hsinchu (TW)

(73) Assignee: Au Optronics Corporation, Hsinchu (TW)

(*) Notice: Subject to any disclaimer, the term of this patent is extended or adjusted under 35 U.S.C. 154(b) by 336 days.

(21) Appl. No.: 13/448,417

(22) Filed: Apr. 17, 2012

(65) Prior Publication Data

US 2013/0165010 A1 Jun. 27, 2013

(30) Foreign Application Priority Data

Dec. 23, 2011 (TW) .............................. 100148581 A

(51) Int. Cl.
*G02F 1/1341* (2006.01)
*G02F 1/13* (2006.01)
*G02F 1/1339* (2006.01)

(52) U.S. Cl.
CPC ............ *G02F 1/1341* (2013.01); *G02F 1/1339* (2013.01); *G02F 2001/13415* (2013.01)

(58) Field of Classification Search
CPC ............... G02F 1/1341; G02F 1/1339; G02F 2001/13415; G02F 1/137; C09K 19/0275; C09K 19/32
USPC ................................................. 349/188, 189
See application file for complete search history.

(56) References Cited

U.S. PATENT DOCUMENTS

| | | | |
|---|---|---|---|
| 5,771,084 A * | 6/1998 | Fujimori et al. | 349/153 |
| 6,636,290 B1 * | 10/2003 | Glownia et al. | 349/187 |
| 7,365,822 B2 | 4/2008 | Lee et al. | |
| 7,505,108 B2 * | 3/2009 | Mochizuki | 349/153 |
| 7,511,785 B2 * | 3/2009 | Ito et al. | 349/117 |
| 7,876,401 B2 | 1/2011 | Hsieh et al. | |
| 8,760,592 B2 * | 6/2014 | Toko | G02F 1/29 349/12 |
| 2003/0156245 A1 * | 8/2003 | Lee et al. | 349/187 |

(Continued)

FOREIGN PATENT DOCUMENTS

| | | |
|---|---|---|
| CN | 1439915 | 9/2003 |
| CN | 1896819 | 1/2007 |
| CN | 101523281 | 9/2009 |

(Continued)

OTHER PUBLICATIONS

"Office Action of China Counterpart Application", issued on Feb. 8, 2014, p. 1-p. 9, in which the listed references were cited.

(Continued)

*Primary Examiner* — Edward Glick
*Assistant Examiner* — David Chung
(74) *Attorney, Agent, or Firm* — Jianq Chyun IP Office

(57) ABSTRACT

A fabrication method of a liquid crystal panel is provided. A first substrate and a liquid crystal material are heated to a first fabrication temperature and a one drop filling (ODF) process is performed to drop the heated liquid crystal material on the first substrate, wherein the first fabrication temperature is lower than 70° C. The first substrate is assembled to a second substrate through a sealant under a second fabrication temperature so that the liquid crystal material is sandwiched between the first substrate and the second substrate and located inside a region surrounded by the sealant, wherein the second fabrication temperature is 50° C. to 70° C. Subsequently, the sealant is solidified.

17 Claims, 3 Drawing Sheets

(56) References Cited

U.S. PATENT DOCUMENTS

| | | | |
|---|---|---|---|
| 2006/0017877 A1* | 1/2006 | Wu | 349/187 |
| 2006/0114385 A1 | 6/2006 | Ito et al. | |
| 2007/0040986 A1* | 2/2007 | Chou | G02F 1/1341 349/189 |
| 2008/0079880 A1* | 4/2008 | Mochizuki et al. | 349/122 |
| 2009/0111349 A1 | 4/2009 | Hsieh et al. | |
| 2011/0080541 A1 | 4/2011 | Hsieh et al. | |
| 2012/0133878 A1* | 5/2012 | Hirakata | 349/141 |

FOREIGN PATENT DOCUMENTS

| | | |
|---|---|---|
| TW | 200408889 | 6/2004 |
| TW | 200619747 | 6/2006 |
| TW | 200919043 | 5/2009 |
| TW | I356929 | 1/2012 |

OTHER PUBLICATIONS

"Office Action of Taiwan Counterpart Application", issued on Jun. 18, 2014, p. 1-p. 8, in which the listed references(Ref. 1-3) were cited.

Heinz-Siegfried Kitzerow et al., "Chirality in Liquid Crystals", Springer, 2001, retrieved from: (http://books.google.com.tw/books?id=C_UfFBXI8WMC&pg=PA205&lpg=PA205&dq=blue+phase+liquid+crystal+viscosity&source=bl&ots=yZ1MToXpzg&sig=Gdu49O5N9Inq5-QpcfneVnmNtXY&hl=zh-TW&sa=X&ei=5OZyVNSfJ-S2mQX9rYGICw&ved=0CGAQ6AEwCA#v=onepage&q=blue%20phase%20liquid%20crystal%20viscosity&f=false).

Andrew Murphy, "Blue Phases in Liquid Crystals", 2011, retrieved from: (http://guava.physics.uiuc.edu/~nigel/courses/569/Essays_Fall2011/Files/murphy.pdf).

* cited by examiner

FABRICATION METHOD OF A LIQUID CRYSTAL PANEL

CROSS-REFERENCE TO RELATED APPLICATION

This application claims the priority benefit of Taiwan application serial no. 100148581, filed on Dec. 23, 2011. The entirety of the above-mentioned patent application is hereby incorporated by reference herein and made a part of this specification.

BACKGROUND OF THE INVENTION

1. Field of the Invention

The invention relates generally to a fabrication method of a panel, and particularly to a fabrication method of a liquid crystal panel.

2. Description of Related Art

A liquid crystal display having the characteristics of small volume, light weight, low driving voltage, low power consumption, convenience in carrying, and the like is becoming a mainstreamed display device of a portable electronic device and an essential daily-used appliance in people's life. Among the known fabrication methods of the liquid crystal panel, a one drop filling (ODF) process is provided for satisfying the requirement for the mass production of the large size liquid crystal panel. Such process is achieved by filling the flowable liquid crystal material in the panel through "dropping". The amount of the liquid crystal material can be properly controlled in the ODF process to save the cost of the liquid crystal material and significantly reduce the spent time for filling the liquid crystal material. Overall, the ODF process is greatly conducive to improve the fabrication efficiency of the liquid crystal panel.

SUMMARY OF THE INVENTION

The invention provides a fabrication method of a liquid crystal panel having high fabrication efficiency and rendering the made liquid crystal panel with desirable quality.

The invention is directed to a fabrication method of a liquid crystal panel. A first substrate and a liquid crystal material are heated to a first fabrication temperature and a one drop filling process is simultaneously performed to drop the heated liquid crystal material on the heated first substrate, wherein the first fabrication temperature is smaller than 70° C. The first substrate is assembled with a second substrate through a sealant under a second fabrication temperature, so that the liquid crystal material is sandwiched between the first substrate and the second substrate and located in a region surrounded by the sealant, wherein the second fabrication temperature is 25° C. to 70° C. Subsequently, the sealant is solidified.

According to an embodiment of the invention, the first fabrication temperature is not less than a blue phase point of the liquid crystal material.

According to an embodiment of the invention, the first fabrication temperature is 25° C. to 70° C.

According to an embodiment of the invention, the second fabrication temperature is not less than an isotropic point of the liquid crystal material.

According to an embodiment of the invention, the second fabrication temperature is 50° C. to 70° C. while an operation temperature is identical to the above first fabrication temperature.

According to an embodiment of the invention, a viscosity of the liquid crystal material is greater than 50 cps.

According to an embodiment of the invention, a viscosity of the liquid crystal material is 700 cps to 1200 cps.

According to an embodiment of the invention, the method of solidifying the sealant includes a photo-curing process, a thermal-curing process, or a combination thereof.

According to an embodiment of the invention, the method of assembling the first substrate and the second substrate under the second fabrication temperature includes assembling the first substrate and the second substrate in a chamber and simultaneously heating the chamber to the second fabrication temperature.

According to an embodiment of the invention, the first substrate is an active device array substrate, a color filter substrate, a substrate with a color filter on an active device array, or an electrode substrate.

According to an embodiment of the invention, the second substrate is an active device array substrate, a color filter substrate, a substrate with a color filter on an active device array, or an electrode substrate.

According to another embodiment of the present invention, an irradiation process is further performed on the liquid crystal material after solidifying the sealant.

According to an embodiment of the invention, a plurality of spacer are sprayed on the first substrate before performing the one drop filling process so that the spacers are located within the region surrounded by the sealant after assembling the first substrate and the second substrate.

In view of the above, the ODF process is adopted in the invention for fabricating the liquid crystal panel, wherein the substrate and the liquid crystal material are heated during the fabrication so that the components in the liquid crystal material are evenly mixed to fabricate the liquid crystal panel with desirable quality.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

The compositions of a blue phase liquid crystal (LC) usually include a host LC, a chiral dopant, and a polymeric monomer. That is to say, the blue phase LC is substantially a composite liquid crystal material containing polymeric monomers and non-polymeric materials. The blue phase LC has the characteristics such as fast response and optical isotropy and thus is becoming concerned. Nevertheless, owing that the blue phase LC is composed of a plurality of materials, the composite LC can not have the blue phase characteristics if the plurality of materials are not properly dissolved with one another (not evenly mixed). Accordingly, during fabricating the liquid crystal panel with such liquid crystal material, the compositions contained therein are required to be properly dissolved with one another. It is noted that the compositions contained in the liquid crystal materials other than the blue phase LC are also required to be properly dissolved with one another during fabricating the liquid crystal panel so that the liquid crystal panel can have satisfactory quality. Therefore, the fabrication method of the liquid crystal panel in the following embodiment is provided for keeping the liquid crystal materials in an even manner during the fabrication of the liquid crystal panel no matter the blue phase LC is adopted or not. That is, the fabrication method in the following descriptions does not limit to the application of the blue phase LC material.

Figure 1A:
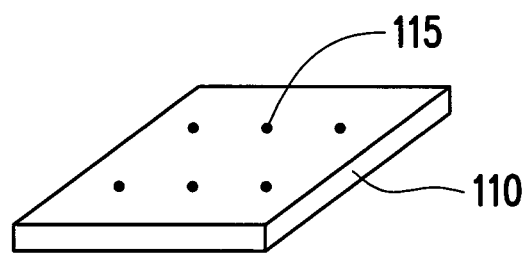
FIG. 1A to FIG. 1E are schematic views illustrating a process of fabricating a liquid crystal panel according to an embodiment of the invention.

FIG. 1A to FIG. 1E are schematic views illustrating a process of fabricating a liquid crystal panel according to an embodiment of the invention. Referring to FIG. 1A, the fabrication method according to the present embodiment includes, for example, providing a first substrate 110, wherein the first substrate 110 can be formed with an active device array, a color filter array, an electrode layer, or a combination thereof. Namely, the first substrate 110 can be an active device array substrate, a color filter substrate, a substrate with a color filter on an active device array, or an electrode substrate. Alternately, a plurality of spacers 115 can be selectively sprayed on the first substrate 110, or the spacers 115 can be formed on the first substrate 110 simultaneously with the fabrication of the active device array, the color filter, the electrode layer, or the like. Herein, the spacers 115 can be a plurality of glass balls or other structures formed by photoresist materials or other materials.

Figure 1B:
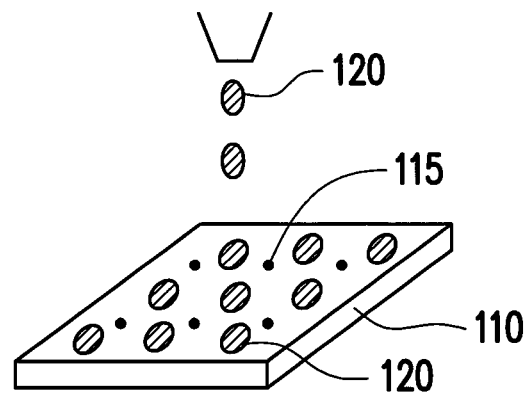

Next, referring to FIG. 1B, an ODF process is performed for dropping a liquid crystal material 120 on the first substrate 110. In the step, the first substrate 110 and the liquid crystal material 120 are both heated to a first fabrication temperature, wherein the first fabrication temperature can be less than about 70° C. Accordingly, the step depicted in FIG. 1B shows that the heated liquid crystal material 120 is dropped on the heated first substrate 110. At this time, the temperature of the first substrate 110 and the temperature of the liquid crystal material 120 are maintained at the level greater than the room temperature and less than about 70° C., in which the room temperature is usually located at about 23° C. to 25° C., but is not limited thereto.

In detail, the process of heating the first substrate 110 can include placing the first substrate 110 on a holder (not shown) and heating the first substrate 110 through the holder. Alternatively, the step of heating the first substrate 100 can include performing the ODF process in a chamber and heating the chamber for increasing the temperature of the first substrate 110. The step of heating the liquid crystal material 120 can include placing the liquid crystal material 120 in a tank (not shown) of the dropping apparatus and heating the tank. Certainly, the above-mentioned heating steps are merely exemplary provided and should not be construed as limitations to this invention. In other embodiments, the first substrate 110 and the liquid crystal material 120 can be heated to the predetermined temperature or to the temperature higher than the room temperature by using other suitable methods.

In this embodiment, the liquid crystal material 120, for example, can be a blue phase liquid crystal material. The blue phase liquid crystal material has particular physical characteristics and is composed of a plurality of compositions, and therefore, the step of heating the liquid crystal material 120 as depicted in FIG. 1B is conducive to improve the fabrication yield rate of dropping the liquid crystal material 120 on the first substrate 110. For instance, the first fabrication temperature is not less than a blue phase point of the liquid crystal material 120, and thus the compositions contained in the liquid crystal material 120 can be evenly mixed to maintain in the blue phase state during the ODF process. In other words, by means of heating, the compositions contained in the liquid crystal material 120 are not easily dissociated.

It is noted that the compositions of the liquid crystal material 120 can include the reactive mesogen (RM), the photo initiator, the host LC, the chiral dopant, and the like. The blue phase point of the liquid crystal material 120 can be varied with the changes of the amount or the type of such molecules. Accordingly, the first fabrication temperature for performing the ODF process can be determined based on the blue phase point of the liquid crystal material 120. Table 1 schematically shows the compositions and the blue phase point of the liquid crystal material 120 in several samples, for example. It is noted that the type specifications and the values represented in table 1 are merely taken as examples and are by no means to be construed as the limitation of the invention.

TABLE 1

| | Mole Ratio (%) | Sample 1 | Sample 2 | Sample 3 | Sample 4 | Sample 5 | Sample 6 | Sample 7 | Sample 8 |
|---|---|---|---|---|---|---|---|---|---|
| RM | RM 257 | 2.8 | 2.52 | 2.8 | 2.6 | 2.63 | 2.71 | 2.63 | 2.67 |
| | EHA | 3.79 | 3.89 | | | 3.91 | 3.94 | | |
| | TMPTA | | | 3.87 | 4.01 | | | 3.93 | 3.96 |
| Photo-initiator reagent | DMPAP | 0.34 | 0.32 | 0.53 | 0.73 | 0.49 | 0.34 | 0.52 | 0.54 |
| Host LC | JC1041XX | 43.84 | 45.66 | 44.94 | 44.74 | 45.73 | 45.63 | 45.76 | 45.57 |
| | 5CB | 44.14 | 42.74 | 43.24 | 43.03 | 44.4 | 44.84 | 44.68 | 44.66 |
| Chiral Dopant | IS-1 | 4.89 | | 4.87 | | | | | |
| | IS-2 | | 4.89 | | 4.89 | | | | |
| | ID-1 | | | | | 2.45 | | 2.45 | |
| | ID-2 | | | | | | 2.45 | | 2.45 |
| Blue Phase Point (° C.) | | 28.1-23.9 | 28.3-25.0 | 39.8-32.5 | 34.5-27.4 | 42.2-32.8 | 61.2-31.8 | 48.8-40.3 | 39.5-30.9 |

In the above listed RM, the molecule structure of RM 257 is:

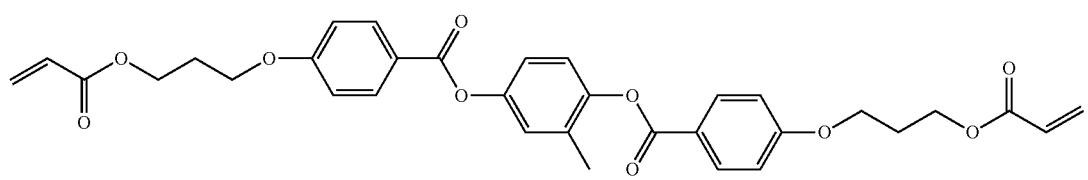 [SMILES: C=CC(=O)OCCCOc1ccc(C(=O)Oc2ccc(OC(=O)c3ccc(OCCCOC(=O)C=C)cc3)c(C)c2)cc1]

The molecule structure of HEA is:

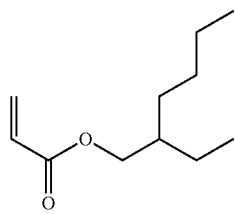

The molecule structure of TMPTA (trimethylolpropane triacrylate) is:

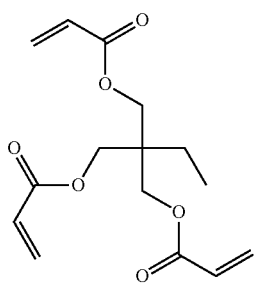 [SMILES: C=CC(=O)OCC(CC)(COC(=O)C=C)COC(=O)C=C]

The molecule structure of the photo initiator DMPAP is:

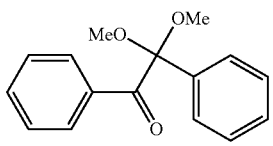 [SMILES: COC(OC)(C(=O)c1ccccc1)c1ccccc1]

In the Host LC, the compounds having the molecule structures as shown below are contained in JC 1041XX:

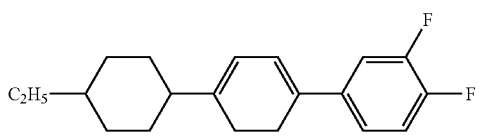

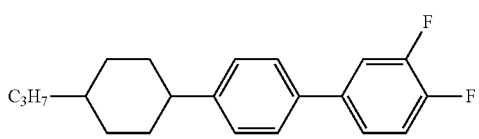

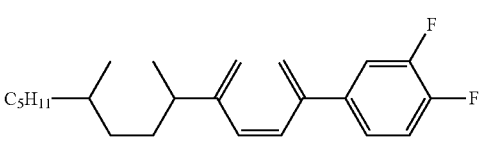

In the above listed Host LC, the molecule structure of 5CB is:

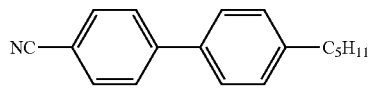

In the above listed chiral dopant, the molecule structure of IS-1 is:

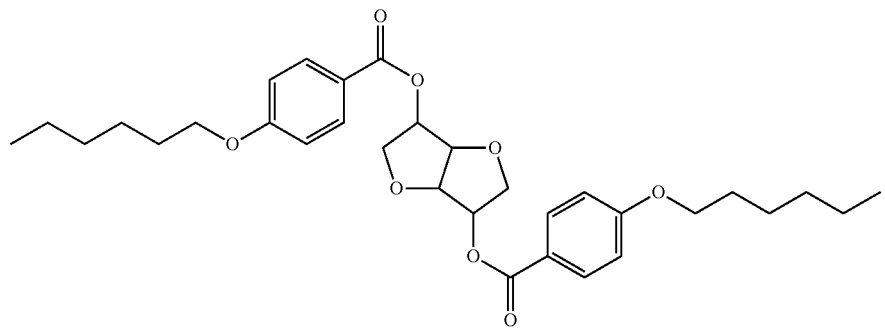 [SMILES: CCCCCCOc1ccc(C(=O)OC2COC3C(OC(=O)c4ccc(OCCCCCC)cc4)COC23)cc1]

The molecule structure of IS-2 is:

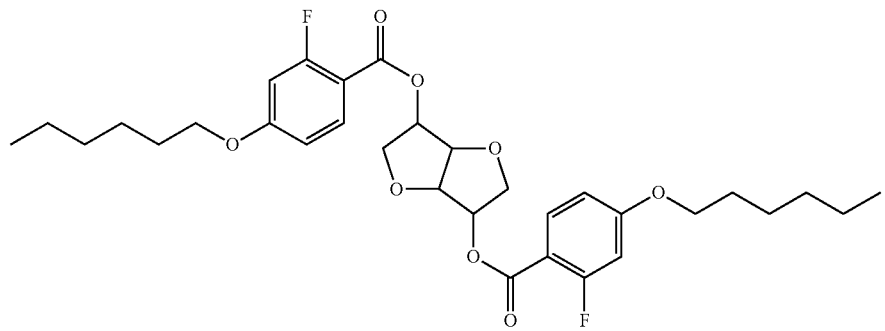 [SMILES: CCCCCCOc1ccc(C(=O)OC2COC3C(OC(=O)c4ccc(OCCCCCC)cc4F)COC23)c(F)c1]

The molecule structure of ID-1 is:

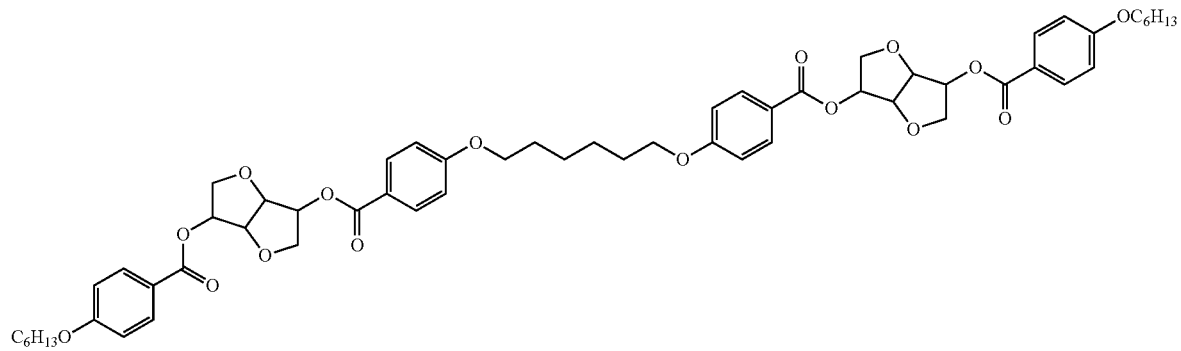

The molecule structure of ID-2 is:

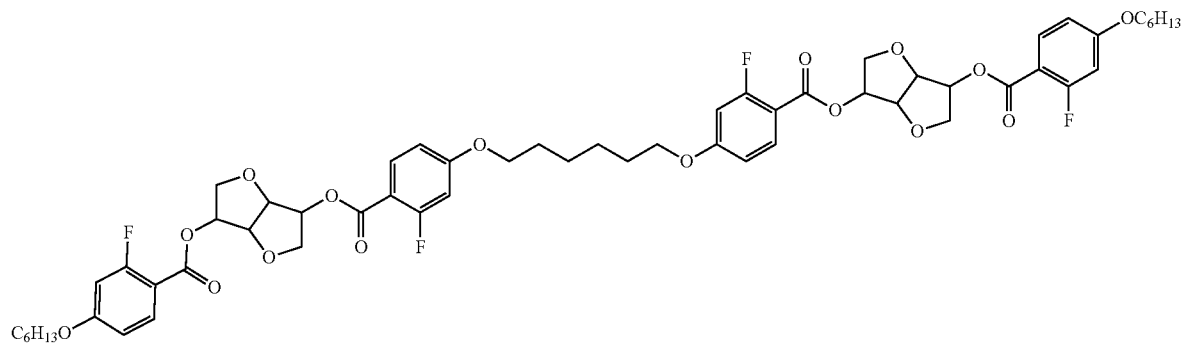

It is shown in the table 1 that the blue phase point of the liquid crystal material 120 can be varied with the compositions and thus the first fabrication temperature can be located within the above blue phase points, such as greater than about 25° C.

In addition, the liquid crystal material 120 and the first substrate 110 are both heated to a temperature greater than the blue phase point. Hence, a temperature decrease is not occurred on the instant the liquid crystal material 120 is in contact with the first substrate 110, which prevents from the drop mura effect. Furthermore, the viscosity of the liquid crystal material 120 at the blue phase point is generally greater than about 50 cps, and even about 700 cps to about 1200 cps. Nevertheless, the nematic liquid crystal material and the vertical liquid crystal material have the viscosity of merely about 20 cps to about 40 cps. The viscosity of the liquid crystal material 120 is obviously increased at the blue phase point. Therefore, by increasing the temperature of the first substrate 110 and the liquid crystal material 120 to the level greater than the blue phase point of the liquid crystal material 120 during the ODF process, the liquid crystal material 120 can be prevented from rapidly spraying after dropping on the first substrate 110.

Figure 1C:
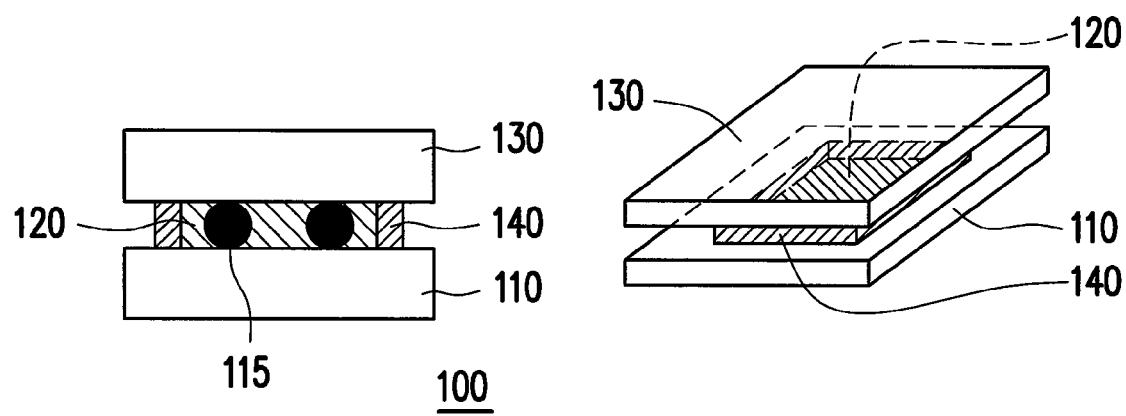

Thereafter, referring to FIG. 1C, the first substrate 110 is assembled with a second substrate 130 through a sealant 140 under a second fabrication temperature, so that the liquid crystal material 120 is sandwiched between the first substrate 110 and the second substrate 130 and located in a region surrounded by the sealant 140. The second fabrication temperature can, for example, be about 25° C. to about 70° C., or about 50° C. to about 70° C. Accordingly, the assembling of the first substrate 110 and the second substrate 120 is performed under the second fabrication temperature in the present embodiment.

Herein, the second substrate 130 can be formed with an active device array, a color filer array, an electrode layer, or a combination thereof. Namely, the second substrate 130 can be an active device array substrate, a color filter substrate, a substrate with a color filter on an active device array, or an electrode substrate. In specific, the combination of the first substrate 110 and the second substrate 130 can be a combination of the active device array substrate and the electrode substrate, a combination of the substrate with the color filter on the active device array and the electrode substrate, or the like.

In the present embodiment, the liquid crystal material 120 having high viscosity is not easily sprayed out during the ODF process. Therefore, the sealant 140 can be fabricated on the second substrate 130 before connecting the first substrate 110 with the second substrate 130 according to the present embodiment. As such, the sealant 140 can be selectively omitted from being disposed on the first substrate 110 during performing the ODF process. It is for sure that the invention should not be construed as limited to the embodiment described above. When the nematic liquid crystal material and the vertical liquid crystal material having low viscosity is applied to the fabrication method provided in the disclosure, the sealant 140 is already formed on the first substrate 110 while the ODF process is performed. Consequently, the sealant 140 can be optionally formed on one of the first substrate 110 and the second substrate 130.

In general, the process of assembling the first substrate 110 with the second substrate 130 is performed in a vacuum chamber (not shown). Accordingly, the chamber can be heated to the second fabrication temperature in the present embodiment so that the assembling of the first substrate 110 and the second substrate 130 can be performed under the second fabrication temperature. As a result, the heated liquid crystal molecule 120 has suitable mobility for being evenly distributed between the first substrate 110 and the second substrate 130. In addition, the liquid crystal material 120 can be completely filled within the region surrounded by the sealant 140 by the squeezing of the first substrate 110 and the second substrate 130 in the assembling process. The spacers 115 located inside the region surrounded by the sealant 140 can lean against between the first substrate 110 and the second substrate 130 so that the cell gap formed between the first substrate 110 and the second substrate 130 can be properly maintained.

In the present embodiment, the compositions contained in the heated liquid crystal material 120 can be mixed well to provide the required blue phase characteristic. The second fabrication temperature adopted in the present embodiment can be optionally greater than the isotropic point of the liquid crystal material 120 so that the compositions of the liquid crystal material 120 can be mixed well during the assembling process. It is noted that the isotropic point of the liquid crystal material 120 is varied with the change of the compositions, and thus the second fabrication temperature adopted in the assembling process can be determined based on the isotropic point of the liquid crystal material 120.

Figure 1D:
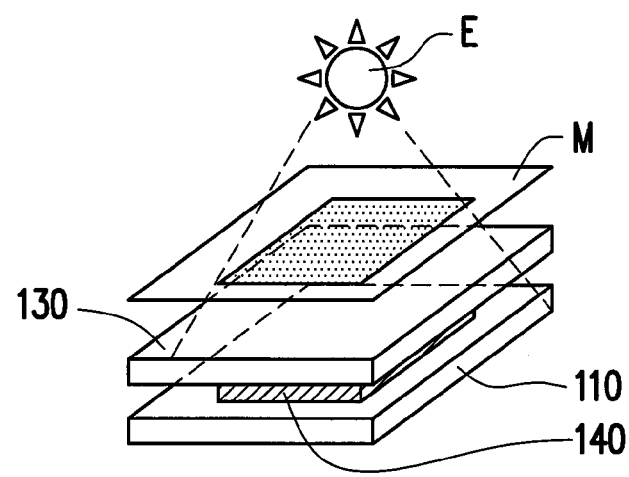

Afterward, referring to FIG. 1D, the sealant 140 is solidified. The solidifying of the sealant 140 can include providing an energy source E to irradiate on the sealant 140 through a mask M so that the energy provided the energy source E can solidify the sealant 140. Certainly, the selection of the energy source E is related to the material of the sealant 140. A photo-curing process can be selected to solidify the sealant 140 when the sealant 140 has the photo-curable characteristic, i.e. the energy E can provide the light such as an ultraviolet (UV) light. A thermal-curing process can be selected to solidify the sealant 140 when the sealant 140 has the thermal-curable characteristic, i.e. the energy E can provide the heat. However, the invention does not preclude the method of solidified the sealant 140 by performing both the photo-curing process and the thermal-curing process. In one embodiment, the method of solidifying the sealant 140 can include performing the photo-curing process following by the thermal-curing process or performing the thermal-curing process following by the photo-curing process.

Herein, the energy sources E irradiates on the sealant 140 through the mask M for solidifying the sealant 140 so that the liquid crystal material 120 can be prevented from the deterioration owing to the irradiation of the energy source E. In other embodiments, the energy source E can directly irradiate on the device without shielding by the mask M when the liquid crystal material 120 is not deteriorated by the irradiation of the energy source E.

Figure 1E:
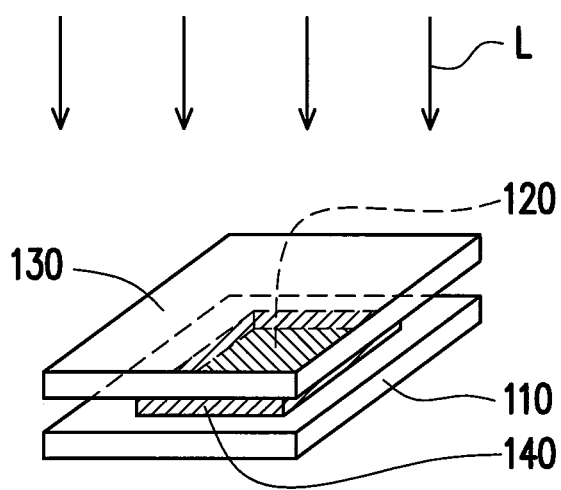

Subsequently, for curing the liquid crystal material 120 with the required characteristics, an irradiating process is performed as shown in FIG. 1E, wherein the light L irradiates on the liquid crystal material 120 so that the compositions contained in the liquid crystal material 120 reacts for forming the liquid crystal panel 100. The energy (such as the wavelength and the intensity) of the light L can be decided based on the liquid crystal material 120 and thus the light L can be the UV light, or the light having the required energy for inducing the photoreaction of the liquid crystal material 120. The step of irradiating the liquid crystal material 120 is taken as an example and can be omitted when the liquid crystal material 120 has the needed characteristics without performing the photoreaction.

In light of the foregoing, the liquid crystal material can be mixed well during the fabrication method so that the liquid crystal material can have the satisfactory blue phase characteristics. The liquid crystal panel can have rapid response by the liquid crystal material with the blue phase characteristic. Furthermore, the liquid crystal material can properly flow during the assembling process of the liquid crystal panel so that the liquid crystal material can be evenly distributed between the first substrate and the second substrate, which facilitates to enhance the quality of the liquid crystal panel. The liquid crystal material has certain viscosity during dropping on the first substrate and is not sprayed out rapidly so that the sealant can be selectively fabricated on one of the first substrate and the second substrate, which conduces to improve the variety of the fabrication method of the liquid crystal panel.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fabrication method of a liquid crystal panel, comprising:

heating a first substrate and a blue phase liquid crystal material to a first fabrication temperature and simultaneously performing a one drop filling process to drop the heated blue phase liquid crystal material on the heated first substrate, wherein the first fabrication temperature is not lower than a blue phase point of the blue phase liquid crystal material and is smaller than about 70° C. such that the compositions contained in the blue phase liquid crystal material are maintained in a blue phase state during the one drop filling process;

assembling the first substrate with a second substrate through a sealant under a second fabrication temperature, so that the liquid crystal material is sandwiched between the first substrate and the second substrate and located in a region surrounded by the sealant, wherein the second fabrication temperature is about 25° C. to about 70° C.; and solidifying the sealant.

2. The fabrication method as claimed in claim 1, wherein the second fabrication temperature is not lower than an isotropic point of the liquid crystal material.

3. The fabrication method as claimed in claim 1, wherein the second fabrication temperature is about 50° C. to about 70° C.

4. The fabrication method as claimed in claim 1, wherein a viscosity of the liquid crystal material is greater than about 50 cps.

5. The fabrication method as claimed in claim 1, wherein a viscosity of the liquid crystal material is about 700 cps to about 1200 cps.

6. The fabrication method as claimed in claim 1, wherein the step of solidifying the sealant comprises a photo-curing process, a thermal-curing process, or a combination thereof.

7. The fabrication method as claimed in claim 1, wherein the step of assembling the first substrate and the second substrate under the second fabrication temperature comprises assembling the first substrate and the second substrate in a chamber and simultaneously heating the chamber to the second fabrication temperature.

8. The fabrication method as claimed in claim 1, wherein the first substrate is an active device array substrate, a color filter substrate, a substrate with a color filter on an active device array, or an electrode substrate.

9. The fabrication method as claimed in claim 1, wherein the second substrate is an active device array substrate, a color filter substrate, a substrate with a color filter on an active device array, or an electrode substrate.

10. The fabrication method as claimed in claim 1, further comprising performing a light irradiation process on the liquid crystal material after the step of solidifying the sealant.

11. The fabrication method as claimed in claim 1, further comprising spraying a plurality of spacer on the first substrate before the step of performing the one drop filling process so that the spacers are located within the region surrounded by the sealant after the step of assembling the first substrate and the second substrate.

12. A fabrication method of a liquid crystal panel, comprising:
heating a first substrate and a blue phase liquid crystal material to a first fabrication temperature and simultaneously performing a one drop filling process to drop the heated blue phase liquid crystal material on the heated first substrate, wherein the first fabrication temperature is not lower than a blue phase point of the blue phase liquid crystal material and is smaller than about 70° C. such that the compositions contained in the blue phase liquid crystal material are maintained in a blue phase state during the one drop filling process;
assembling the first substrate with a second substrate through a sealant under a second fabrication temperature, so that the liquid crystal material is sandwiched between the first substrate and the second substrate and located in a region surrounded by the sealant, wherein the first substrate and the second substrate are assembled in a chamber while the chamber is being heated simultaneously to the second fabrication temperature, which is about 25° C. to about 70° C.; and
solidifying the sealant.

13. A fabrication method of a liquid crystal panel, comprising:
(a) heating a first substrate and a blue phase liquid crystal material to a first fabrication temperature and simultaneously performing a one drop filling process to drop the heated blue phase liquid crystal material on the heated first substrate, wherein the first fabrication temperature is smaller than about 70° C. and greater than a room temperature, and wherein the first fabrication temperature is not less than a blue phase point of the blue phase liquid crystal material so that compositions contained in the blue phase liquid crystal material are maintained in a blue phase state during the one drop filling process and a temperature decrease is not occurred on the instant the blue phase liquid crystal material is in contact with the first substrate thereby the compositions are not dissociated;

(b) after the step (a), assembling the first substrate with a second substrate through a sealant under a second fabrication temperature, so that the blue phase liquid crystal material is sandwiched between the first substrate and the second substrate and located in a region surrounded by the sealant and the blue phase liquid crystal material is distributed therebetween, wherein the second fabrication temperature is about 25° C. to about 70° C. and the second fabrication temperature is greater than an isotropic point of the blue phase liquid crystal material so that the compositions of the blue phase liquid crystal material are mixed; and (c) solidifying the sealant.

14. The fabrication method as claimed in claim 13, wherein the first fabrication temperature is not lower than a blue phase point of the liquid crystal material.

15. The fabrication method as claimed in claim 13, wherein the first fabrication temperature is about 25° C. to about 70° C.

16. The fabrication method as claimed in claim 13, wherein the second fabrication temperature is not lower than an isotropic point of the liquid crystal material.

17. The fabrication method as claimed in claim 13, wherein the step of assembling the first substrate and the second substrate under the second fabrication temperature comprises assembling the first substrate and the second substrate in a chamber and simultaneously heating the chamber to the second fabrication temperature.

* * * * *